(12) United States Patent
Ratnaparkhi et al.

(10) Patent No.: US 7,231,375 B2
(45) Date of Patent: Jun. 12, 2007

(54) COMPUTER AIDED QUERY TO TASK MAPPING

(75) Inventors: Adwait Ratnaparkhi, Redmond, WA (US); Robert John Ragno, Kirkland, WA (US); Felipe Luis Naranjo, Seattle, WA (US); Boris Gorodnitsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 10/683,807

(22) Filed: Oct. 10, 2003

(65) Prior Publication Data

US 2005/0080782 A1    Apr. 14, 2005

(51) Int. Cl.
*G06F 15/00*    (2006.01)
(52) U.S. Cl. .............................. 706/12; 706/11; 706/14; 706/16; 706/45; 706/61; 715/526; 715/700; 715/731; 715/735; 715/738; 715/762; 715/764
(58) Field of Classification Search .................. 706/11, 706/12, 14–16, 18, 20, 46, 48, 61; 702/2–5; 707/2–5; 715/505–516, 526, 700, 705, 712–714, 715/731, 735, 738, 739, 745, 762, 764, 780, 715/816
See application file for complete search history.

(56) References Cited

U.S. PATENT DOCUMENTS

| | | | |
|---|---|---|---|
| 6,169,986 B1 | 1/2001 | Bowman et al. ................ 707/5 |
| 6,269,368 B1 | 7/2001 | Diamond ....................... 707/6 |
| 6,285,998 B1 | 9/2001 | Black et al. .................... 707/4 |
| 6,728,702 B1* | 4/2004 | Subramaniam et al. ........ 707/3 |
| 6,751,606 B1* | 6/2004 | Fries et al. ..................... 707/3 |
| 6,751,614 B1* | 6/2004 | Rao ............................. 707/5 |
| 6,868,525 B1* | 3/2005 | Szabo ........................ 715/738 |
| 2002/0107842 A1 | 8/2002 | Biebeshelmer et al. ........ 707/3 |
| 2002/0152202 A1 | 10/2002 | Perro et al. .................... 707/3 |
| 2003/0033288 A1* | 2/2003 | Shanahan et al. .............. 707/3 |
| 2003/0115191 A1* | 6/2003 | Copperman et al. ........... 707/3 |
| 2003/0172061 A1 | 9/2003 | Krupin et al. ................. 707/3 |

OTHER PUBLICATIONS

European Search Report dated Mar. 20, 2006 for Application No. 04017760.2 filed Jul. 27, 2004.

(Continued)

*Primary Examiner*—Joseph P Hirl
*Assistant Examiner*—Omar Fernández Rivas
(74) *Attorney, Agent, or Firm*—John D. Veldhuis-Kroeze; Westman, Champlin & Kelly, P.A.

(57) ABSTRACT

An annotating system aids a user in mapping a large number of queries to tasks to obtain training data for training a search component. The annotating system includes a query log containing a large quantity of queries which have previously been submitted to a search engine. A task list containing a plurality of possible tasks is stored. A machine learning component processes the query log data and the task list data. For each of a plurality of query entries corresponding to the query log, the machine learning component suggests a best guess task for potential query-to-task mapping as a function of the training data. A graphical user interface generating component is configured to display the plurality of query entries in the query log in a manner which associates each of the displayed plurality of query entries with its corresponding suggested best guess task.

23 Claims, 16 Drawing Sheets

OTHER PUBLICATIONS

"POPFile Automatic Email Sorting using Naive Bayes," http://popfile.sourceforge.net/old.html at least by Aug. 5, 2003.
"Java Client Desktop Applications: Properties Pane," http://developer.apple.com/documentation/WebObjects/DesktopApplications/InsideAssistant/com at least by Aug. 4, 2003.
Rennie et al., J. "Tackling the Poor Assumption of Naive Bayes Text Classifiers," Proceedings of the Twentieth International Conference on Machine Learning, Aug. 22, 2003.
Heckerman, D. "A Tutorial on Learning With Bayesian Networks," Technical Report MSR-TR-95-06, Mar. 1995.

* cited by examiner

| Task List | Query Bundle | # of Queries | Freq | Best Guess | Best Guess Prob. |
|---|---|---|---|---|---|
| access shared printer | firewall | 101 | 19449 | install firewall | 67 |
| access system info | register | 293 | 11892 | save picture | 1 |
| add address to address | netmeeting | 112 | 11647 | save picture | 1 |
| add comment date and | printer | 196 | 8239 | configure printer | 26 |
| add contact | boot disk | 49 | 8269 | copy file to floppy disk | 15 |
| add icon to desktop | format | 172 | 7657 | format paragraph in email | 25 |
| ... | cookies | 81 | 7652 | save picture | 1 |
| backup data to tape | password | 100 | 7611 | change password | 28 |
| burn file to CD | startup | 229 | 7294 | troubleshoot startup comput | 24 |
| burn music to CD | email | 45 | 7331 | e-mail picture | 6 |
| capture screen content | dvd | 13 | 7361 | save picture | 1 |
| change font in documen | administrator | 309 | 6851 | administer user account | 1 |
| change password | startup disk | 97 | 6811 | troubleshoot startup comput | 29 |
| change user account | activation | 194 | 6398 | learn about op system activat | 10 |
| change volume sound to | backup | 35 | 6350 | learn about backup | 30 |
| check for e-mail messa | ntfs | 10 | 6338 | save picture | 1 |
| close program all | partition | 200 | 5837 | create partition | 44 |
| compress file and fold | cd | 24 | 5308 | save picture | 1 |
| configure display setti | ... | ... | ... | ... | ... |
| configure Internet Exp | compatibility | 277 | 4570 | save picture | 1 |
| configure modem | copy cd | 49 | 4675 | copy music | 39 |
| configure modem for fa | remote desktop | 52 | 4670 | learn about desktop | 27 |
| ... | | | | | |

FIG. 3

| Task List | Query Bundle | # of Queries | Freq | Best Guess | Best Guess Prob. |
|---|---|---|---|---|---|
| access shared printer | firewall | 101 | 19449 | install firewall | 67 |
| access system info | register | 293 | 11892 | save picture | 1 |
| add address to address | netmeeting | 112 | 11647 | save picture | 1 |
| add comment date and | printer | 196 | 8239 | configure printer | 26 |
| add contact | boot disk | 49 | 8269 | copy file to floppy disk | 15 |
| add icon to desktop | format | 172 | 7657 | format paragraph in email | 25 |
| ... | cookies | 81 | 7652 | save picture | 1 |
| backup data to tape | password | 100 | 7611 | change password | 28 |
| burn file to CD | startup | 229 | 7294 | troubleshoot startup comput | 24 |
| burn music to CD | email | 45 | 7331 | e-mail picture | 6 |
| capture screen content | dvd | 13 | 7361 | save picture | 1 |
| change font in documen | administrator | 309 | 6851 | administer user account | 1 |
| change password | startup disk | 97 | 6811 | troubleshoot startup comput | 29 |
| change user account | activation | 194 | 6398 | learn about op system activat | 10 |
| change volume sound to | backup | 35 | 6350 | learn about backup | 30 |
| check for e-mail messa | ntfs | 10 | 6338 | save picture | 1 |
| close program all | partition | 200 | 5837 | create partition | 44 |
| compress file and fold | cd | 24 | 5308 | save picture | 1 |
| configure display setti | ... | ... | ... | ... | ... |
| configure Internet Exp | compatibility | 277 | 4570 | save picture | 1 |
| configure modem | copy cd | 49 | 4675 | copy music | 39 |
| configure modem for fa | remote desktop | 52 | 4670 | learn about desktop | 27 |
| ... | | | | | |

FIG. 4

| Task List | Query Bundle | # of Queries | Freq | Best Guess | Best Guess Prob. |
|---|---|---|---|---|---|
| access shared printer | firewall | 101 | 19449 | install firewall | 67 |
| access system info | register | 293 | 11892 | save picture | 1 |
| add address to address | netmeeting | 112 | 11647 | save picture | 1 |
| add comment date and | printer | 196 | 8239 | configure printer | 26 |
| add contact | boot disk | 49 | 8269 | copy file to floppy disk | 15 |
| add icon to desktop | format | 172 | 7657 | format paragraph in email | 25 |
| ... | cookies | 81 | 7652 | save picture | 1 |
| backup data to tape | password | 100 | 7611 | change password | 28 |
| burn file to CD | startup | 229 | 7294 | troubleshoot startup comput | 24 |
| burn music to CD | email | 45 | | Next Best Guesses | |
| capture screen content | dvd | 13 | | change password | |
| change font in documen | administrator | 309 | | change or delete a password | |
| change password | startup disk | 97 | | passwords for files | |
| change user account | activation | 194 | | password doesn't work. | |
| change volume sound to | backup | 35 | | protect a document | |
| check for e-mail messa | ntfs | 10 | | strategies for sharing documents | |
| close program all | partition | 200 | | Require a password to modify a document | |
| compress file and fold | cd | 24 | | Require a password to open a document | |
| configure display setti | ... | ... | | Change OS password | |
| configure Internet Exp | compatibility | 277 | | Change network password | |
| configure modem | copy cd | 49 | 4673 | copy music | 39 |
| configure modem for fa | remote desktop | 52 | 4670 | learn about desktop | 27 |

FIG. 5

| Task List | Query Bundle | # of Queries | Freq | Best Guess | Best Guess Prob. |
|---|---|---|---|---|---|
| access shared printer | firewall | 101 | 19449 | install firewall | 67 |
| access system info | register | 293 | 11892 | save picture | 1 |
| add address to address | netmeeting | 112 | 11647 | save picture | 1 |
| add comment date and | printer | 196 | 8239 | configure printer | 26 |
| add contact | boot disk | 49 | 8269 | copy file to floppy disk | 15 |
| add icon to desktop | format 340 350 | 172 | 7657 | format paragraph in email | 25 |
| ... | cookies | 81 | 7652 | save picture | 1 |
| | passwords | 100 | 7611 | change password | 28 |
| backup data to tape | startup | 229 | 7294 | troubleshoot startup comput | 24 |
| burn file to CD | dvd | | | | 6 |
| burn music to CD | adm | Queries in Query Bundle | | account | 1 |
| capture screen content | sta | How do I change my password? | | rtup comput | 1 |
| change font in documen | act | How to set password? | | stem activat | 29 |
| change password | bac | Can I change the password? | | up | 10 |
| change user account | ntf | Can I keep anyone from modifying the document? | | | 30 |
| change volume sound to | par | ... | | | 1 |
| check for e-mail messa | cd | How do I remove the password? | | | 44 |
| close program all | ... | Do I need a network password? | | | 1 |
| compress file and fold | | ... | | | ... |
| configure display setti | com | | | | 1 |
| configure Internet Exp | cop | | | | 39 |
| configure modem | remove desktop | | | team labout desktop | 27 |
| configure modem for fa | | | | | |
| ... | | | | | |

FIG. 6

| Task List | Query Bundle | # of Queries | Freq | Best Guess | Best Guess Prob. |
|---|---|---|---|---|---|
| access shared printer | firewall | 101 | 19449 | install firewall | 67 |
| access system info | register | 293 | 11892 | save picture | 1 |
| add address to address | netmeeting | 112 | 11647 | save picture | 1 |
| add comment date and | printer | 196 | 8239 | configure printer | 26 |
| add contact | boot disk | 49 | 8269 | copy file to floppy disk | 15 |
| add icon to desktop | format | 172 | 7657 | format paragraph in email | 25 |
| ... | cookies | 81 | 7652 | save picture | 1 |
| backup data to tape 340 | password | 100 | 7611 | change password | 28 |
| burn file to CD | startup | 229 | 7294 | troubleshoot startup comput | 24 |
| burn music to CD | email | 45 | 7331 | e-mail picture | 6 |
| capture screen content | dvd | 13 | 7361 | save picture | 1 |
| change font in documen | administrator | 309 | 6851 | administer user account | 1 |
| change password | startup disk | 97 | 6811 | troubleshoot startup comput | 29 |
| change user account | activation | 194 | 6398 | learn about op system activat | 10 |
| change volume sound to | backup | 35 | 6350 | learn about backup | 30 |
| check for e-mail messa | ntfs | 10 | 6338 | save picture | 1 |
| close program all | partition | 200 | 5837 | create partition | 44 |
| compress file and fold | cd | 24 | 5308 | save picture | 1 |
| configure display setti | ... | ... | ... | ... | ... |
| configure Internet Exp | compatibility | 277 | 4570 | save picture | 1 |
| configure modem | copy cd | 49 | 4675 | copy music | 39 |
| configure modem for fa | remote desktop | 52 | 4670 | learn about desktop | 27 |
| ... | | | | | |

FIG. 7

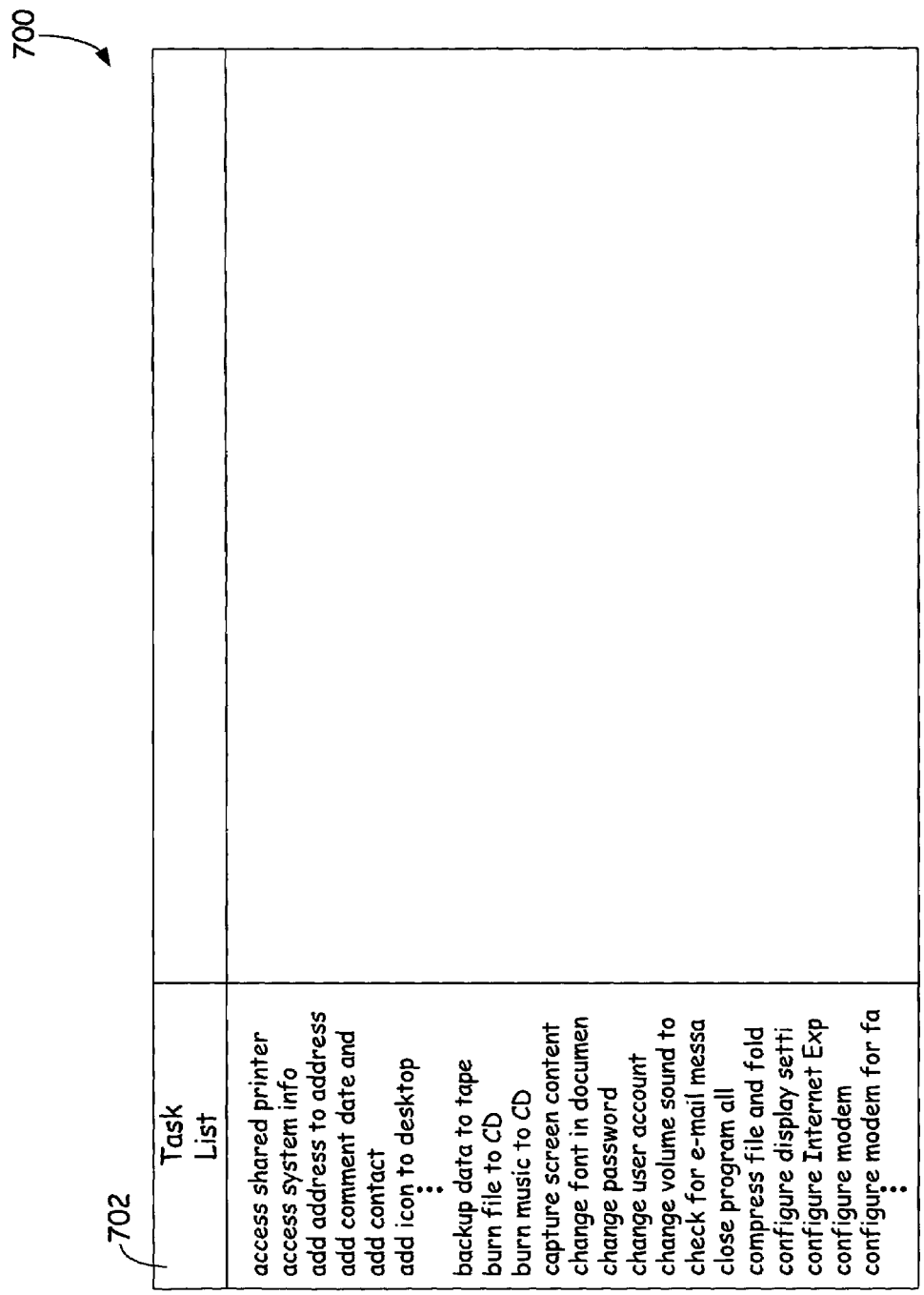

FIG. 14

| Task List | Suggested Queries |
|---|---|
| access shared printer<br>access system info<br>add address to address<br>add comment date and<br>add contact<br>add icon to desktop<br>...<br>backup data to tape<br>burn file to CD<br>burn music to CD<br>capture screen content<br>change font in documen<br>change password<br>change user account<br>change volume sound to<br>check for e-mail messa<br>close program all<br>compress file and fold<br>configure display setti<br>configure Internet Exp<br>configure modem<br>configure modem for fa<br>... | How do I change my password?<br>How to set password?<br>Can I change the password?<br>How do I set a read only password?<br>Can I keep anyone from modifying the document?<br>...<br>How do I remove the password?<br>Do I need a network password? |

COMPUTER AIDED QUERY TO TASK MAPPING

BACKGROUND OF THE INVENTION

The present invention relates to training a machine learning component of a user interface. More particularly, the present invention relates to obtaining training data by mapping queries to tasks.

A natural user interface accepts natural language queries, and in response returns a list of results which are most likely to correspond to the intended query subject matter. The results typically include tasks, documents, files, emails, or other items (all collectively referred to herein as tasks) which hopefully answer the query. A promising technology for producing the results for a query is machine learning technology. Machine learning algorithms use statistical data to predict a desired result for a particular query. Using machine learning algorithms, the statistical data can be constantly or frequently updated after initial training based upon the results of further queries from a user.

Before any machine learning algorithm can be provided for use with a natural user interface with the expectation that it will provide meaningful results, the algorithm must be "trained" with accurate annotated data. In other words, the algorithm requires training data indicative of statistics from a large list of query-to-task mappings. When the natural user interface and corresponding machine learning algorithm is to be deployed to a customer, it is even more essential that the machine learning algorithm be trained with accurate annotated data prior to its deployment. For example, with one type of output of the machine learning algorithm being a list of tasks, such as "install a printer" or "printer trouble shooting", the machine learning algorithm requires data representative of examples of natural language queries for which these tasks would be the desired result.

In order to increase the accuracy of the machine learning algorithm of the natural user interface, the training data must be representative of a very large list of examples of query-to-task mappings. Conventionally, the large number of query-to-task mappings has been produced by obtaining a query log containing a very large number of actual queries submitted to a search engine. For example, the query log would typically include on the order of 10,000 queries or more. The user or author would then go through those queries one-by-one and manually annotate them (associate them with a particular task).

A common method of annotating the queries to tasks is to represent each of the queries in a first column of a spread sheet database, and to represent their corresponding intended task in the same row of a second column of the spread sheet. This process is therefore very labor intensive and time consuming. Further, given a very large list of potential tasks to choose from, selecting which task to annotate with a particular query becomes even more cumbersome.

Therefore, a system or method which can be used to facilitate faster and more accurate query-to-task mapping to obtain training data would be an significant improvement in the art.

SUMMARY OF THE INVENTION

An annotating system aids a user in mapping a large number of queries to tasks to obtain training data for training a search component. The annotating system includes a query log containing a large quantity of queries which have previously been submitted to a search engine. A task list containing a plurality of possible tasks is stored. A machine learning component processes the query log data and the task list data. For each of a plurality of query entries corresponding to the query log, the machine learning component suggests a best guess task for potential query-to-task mapping as a function of the training data. A graphical user interface generating component is configured to display the plurality of query entries in the query log in a manner which associates each of the displayed plurality of query entries with its corresponding suggested best guess task.

BRIEF DESCRIPTION OF THE DRAWINGS

FIGS. 3–7 are diagrammatic illustrations of a graphical user interface which can be generated using the system shown in FIG. 2 in order to aid a user in efficiently performing query-to-task mappings.

FIGS. 13 and 14 are diagrammatic illustrations of a graphical user interface which can be generated using the system shown in FIG. 2 in order to aid a user in efficiently performing query-to-task mappings as a task-centric operation, as opposed to as a query-centric operation as illustrated in FIGS. 3–7.

DETAILED DESCRIPTION OF ILLUSTRATIVE EMBODIMENTS

The present invention is described with respect to an annotating system for aiding a user in performing bulk mapping of queries from a query log to tasks in order to obtain training data for training a search component. The present invention also includes methods, and computer readable medium embodying those methods, of aiding the user in mapping a large number of queries to corresponding tasks in order to obtain and/or update training data.

Figure 1:
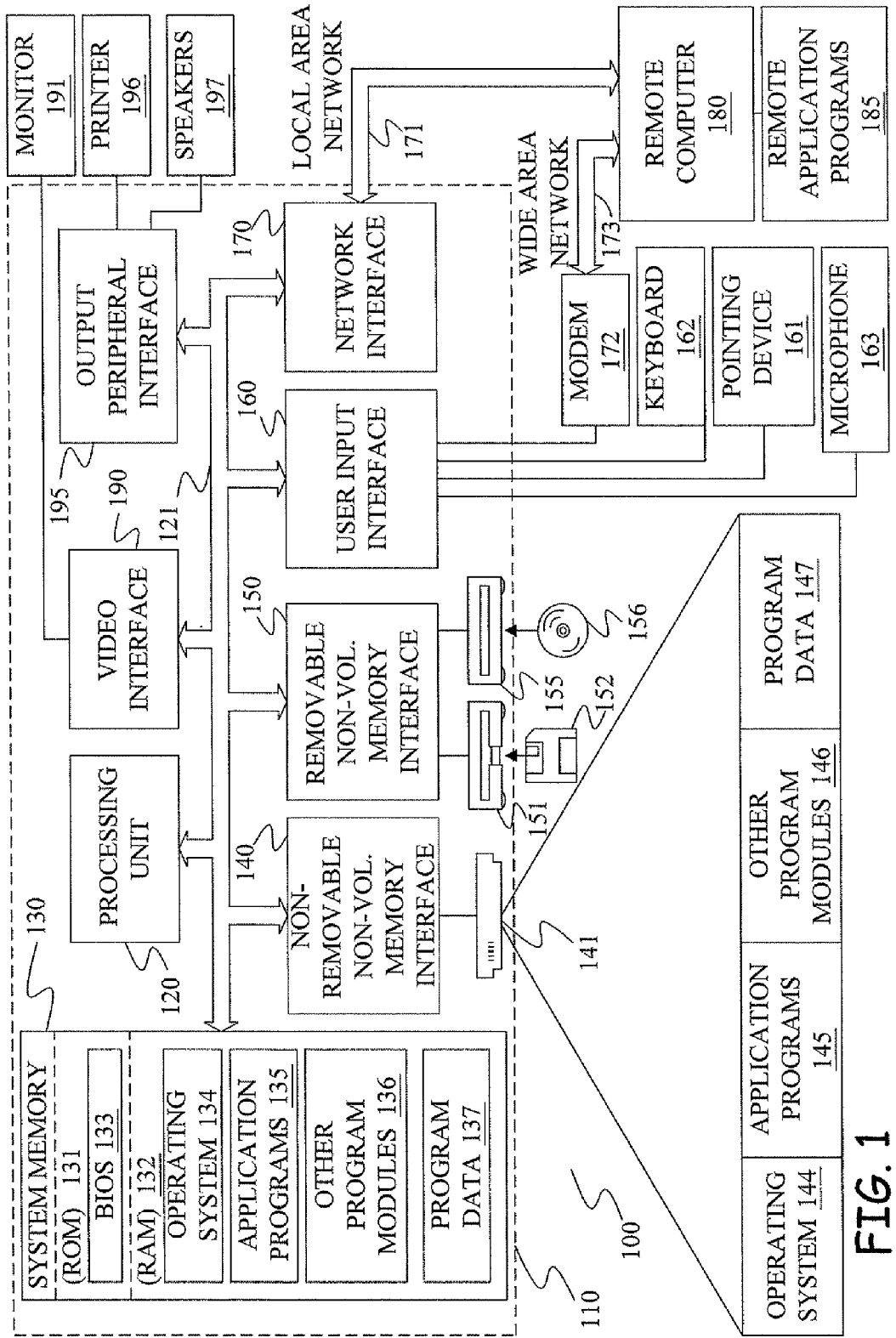
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
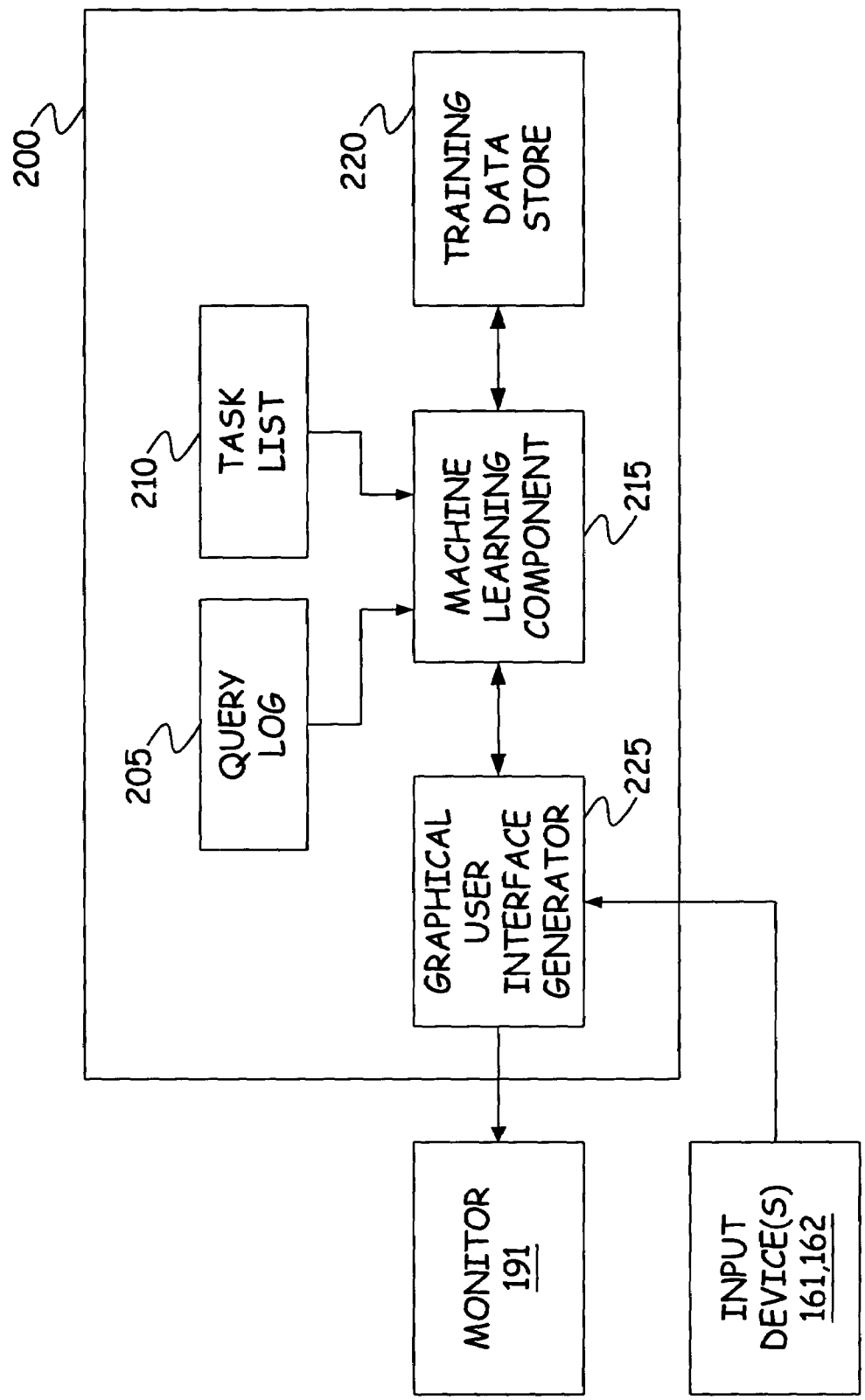
FIG. 2 is a block diagram illustrating one exemplary embodiment of a annotating system in accordance with the present invention.
Figure 8:
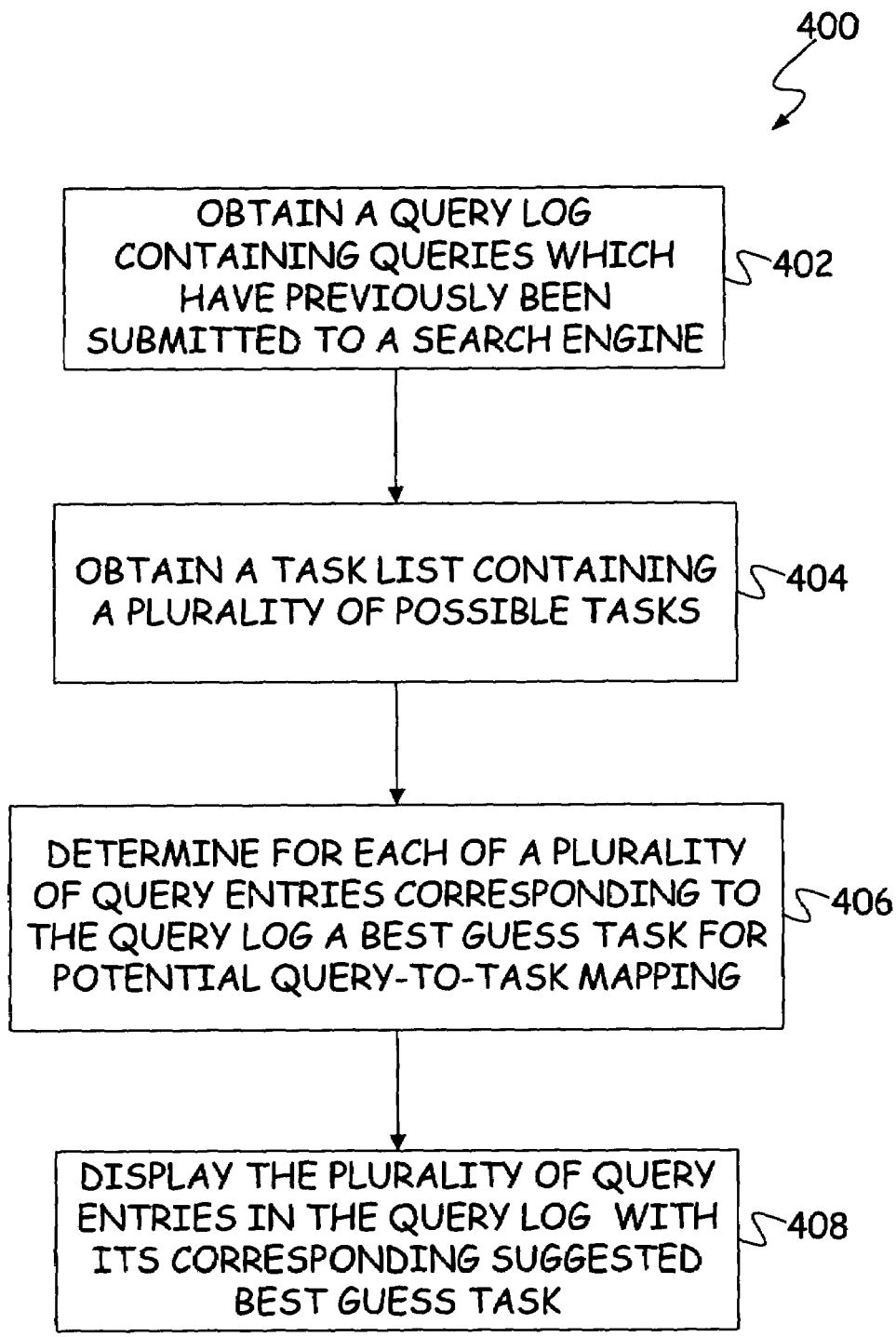
FIGS. 8–12 are flow diagrams illustrating embodiments of methods of the present invention.

FIG. 2 illustrates an annotating system 200 in accordance with the present invention, which can be implemented in a processing environment such as the one illustrated in FIG. 1. Annotating system 200 aids a user in performing bulk mapping of queries to tasks to obtain training data for training a search component. System 200 includes, or in other embodiments obtains, a query log 205 containing data representative of queries which have previously been submitted to a search engine. Typically, query log will contain data representative of a large number of queries, for example 10,000 or more. However, smaller query logs can also be used. A task list 210 containing data representative of a large number of possible tasks is included. To obtain and continuously update training data 220, system 200 aids a user in mapping each query in query log 205 to a task in task list 210.

A machine learning component or classifier 215 retrieves query entries from query log 205 and the list of tasks from task list 210. As defined herein, a query entry can be, for example, an individual query from the query log. In the alternative, a query entry can be a query bundle representing multiple queries in query log 205 which have been bundled together. Query bundles are created through query log clustering of the raw query logs. An example of a query bundle is a series of similar queries which include small misspellings of various words in the query. Mapping query bundles to tasks, instead of mapping each individual query to a task one at a time, provides significant time savings.

For each of a plurality of query entries corresponding to the query log, the machine learning component uses the training data 220 to suggests a best guess task for potential query-to-task mapping. The guesses are produced by the machine learning component based on the statistical information from previously mapped queries. Initially, with little statistically significant data in training data 220, the best guesses will not be as accurate as desired. However, as more queries are mapped, the accuracy of the guesses will improve. As is described below in greater detail, the user or author always has the choice to override the guesses from the system.

In effect, every time the author accepts a guess, he or she "teaches" the system how to map queries to tasks. Upon updating the training data by mapping a particular query entry to a task, the machine learning component 215 is configured to automatically update the best guess task for each of the remaining query entries as a function of the updated training data 220. Once enough data has been annotated, it can be used to train a machine learning algorithm for deployment in a search component of a natural user interface platform. An example of a machine learning component or classifier type which can continuously update its best guesses in this manner is a Naive Bayes classifier.

In system 200, a graphical user interface (GUI) generating component 225 is included in order to interface between machine learning component 215 and the user via a display (such as monitor 191) and input devices (such as devices 161, 162). Component 225 is configured to display the plurality of query entries in the query log in a manner which associates each of the displayed plurality of query entries with its corresponding suggested best guess task. Component 225 is also configured to receive various types of inputs from the user to further the mapping process. The GUI generated by component 225 in accordance with an exemplary embodiment is shown in FIGS. 3–7.

Referring now to FIG. 3, shown is a GUI 300 which can be displayed on monitor 191 in accordance with some embodiments of the invention. GUI 300 includes a task list 302, a query entry list (illustrated as a query bundle list) 304, a column 306 indicating the number of queries in each query bundle, a column 308 indicating the frequency of occurrence of the queries, a best guess 310 for each query entry as generated by the machine learning component 215, and a column 312 indicating the probability of the suggested best guess being accurate. Task list 302 is a list of tasks to which a query entry can be mapped if the best guess task is not selected by the author for query-to-task mapping. Also, when the query entry 304 is a query bundle, the suggested best guess task 310 for each query bundle can be a weighted average of best guesses for each of the plurality of queries represented by the query bundle.

Referring now to FIG. 4, the GUI generating component 225 is further configured to receive a first type of input from the user when the user wishes to map a particular query entry to its corresponding suggested best guess task. In the example shown in FIG. 4, the user maps all of the queries represented by query bundle "password" to the best guess task of "change password" generated by the machine learning component. The first type of input used to instruct this mapping to proceed can be, for example, a right click of a mouse type pointing device with cursor 340 positioned over this query entry. Lines 350 represent selection or highlighting of this query entry and the associated statistics and best guess task. Upon receipt of the first type of input through the GUI 300, the machine learning component 215 updates the training data by mapping the particular query entry to the suggested best guess task. As discussed above, the best guess tasks for the remaining query entries are then updated based upon the updated training data.

Referring now to FIG. 5, if instead of mapping the query entry to the suggested best guess task, the user wishes to review a list of statistically determined next best guess tasks, this can be achieved by providing an appropriate input. For example, in one embodiment, a mouse click with cursor 340 positioned over the suggested best guess "change password" task results in drop down menu 360 containing the list of next best guesses being displayed. A user can then map the query entry in question to any of the next best guess tasks by clicking on the desired task in menu 360.

Referring now to FIG. 6, if desired, the user can view individual queries represented by a query bundle type of query entry. For example, the GUI generating component 225 is configured, in some embodiments, to receive a second type of input from the user when the user wishes to view a drop down menu 370 containing a list of queries represented by a particular query bundle. In response to the input, the GUI generating component displays the menu 370. An example of a second type of input is a double click with the cursor positioned over the "password" query bundle. Individual queries listed in the menu 370 can then be mapped to a task one at a time if desired.

Referring now to FIG. 7, if none of the suggested best guess tasks is appropriate for mapping to a query entry, the user can map the query entry to a task from task list 302 by providing an appropriate input. As an example, in one embodiment an appropriate input includes selecting a query entry (for example "cd" shown as selected by lines 380), and then clicking on a task from list 302.

Referring now to FIGS. 8–12, shown are flow diagrams 400, 450, 500, 550 and 600 illustrating various steps of some embodiments of methods of the invention. These flow diagrams summarize some aspects of the invention as described above with reference to FIGS. 1–7. As shown in flow diagram 400 of FIG. 8, a method of aiding a user in performing bulk mapping of queries to tasks to obtain training data for training a search component includes obtaining a query log of queries which have previously been submitted to a search engine. This is illustrated at block 402. As illustrated at block 404, the method also includes obtaining a task list of possible tasks. At block 406, the method is shown to include determining, for each of a plurality of query entries corresponding to the query log, a best guess task for potential query-to-task mapping. The best guess task is determined as a function of the training data using a machine learning component. At block 408, the method is shown to include displaying the plurality of query entries in the query log in a manner which associates each of the displayed plurality of query entries with its corresponding suggested best guess task.

Figure 9:
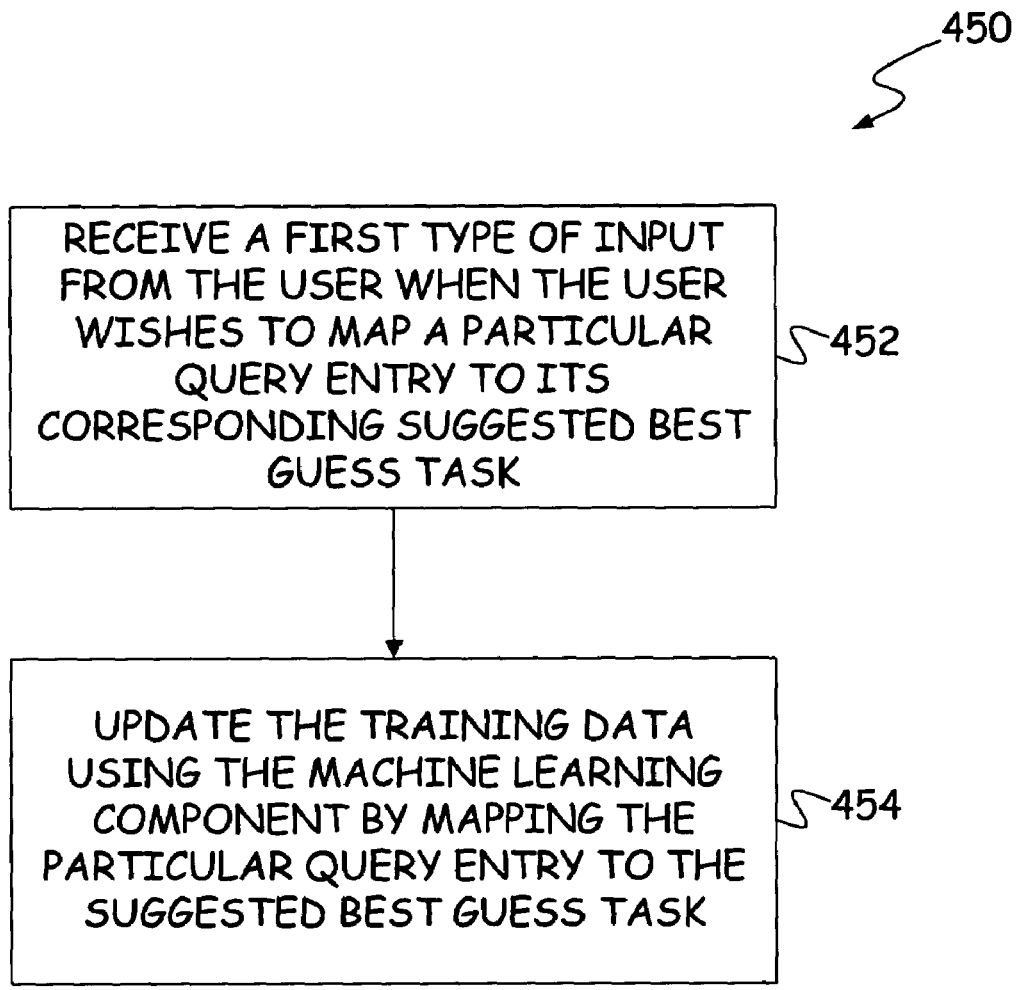

Referring now to FIG. 9, the method can also include the steps of receiving a first type of input from the user when the user wishes to map a particular query entry to its corresponding suggested best guess task as shown at block 452, and updating the training data using the machine learning component as shown at block 454.

Figure 10:
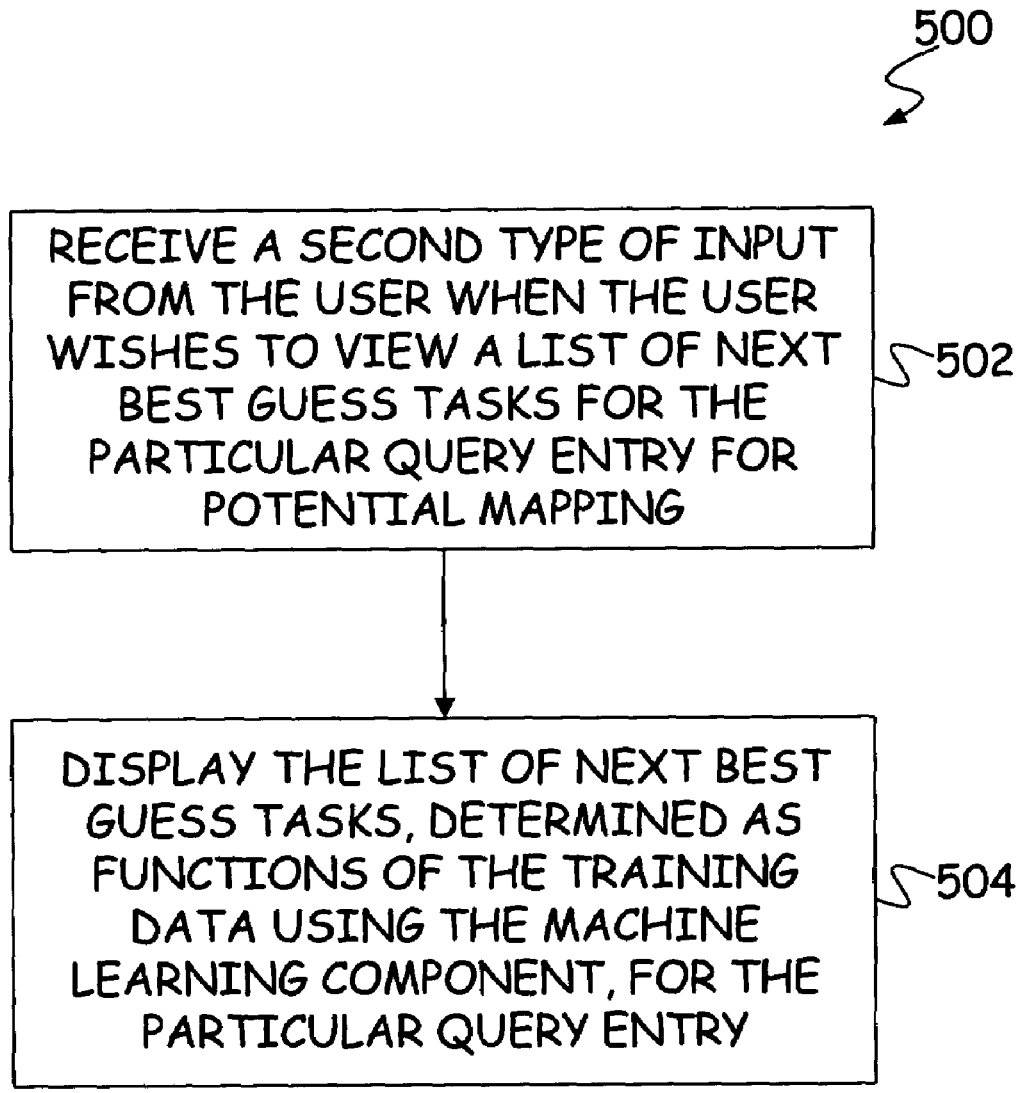

Referring now to FIG. 10, in some embodiments the methods of the present invention further include the step shown at block 502 of receiving a second type of input from the user when the user wishes to view a list of next best guess tasks for the particular query entry for potential mapping. In these embodiments, the method then includes the step shown at block 504 of displaying the list of next best guess tasks, determined as functions of the training data using the machine learning component, for the particular query entry.

Figure 11:
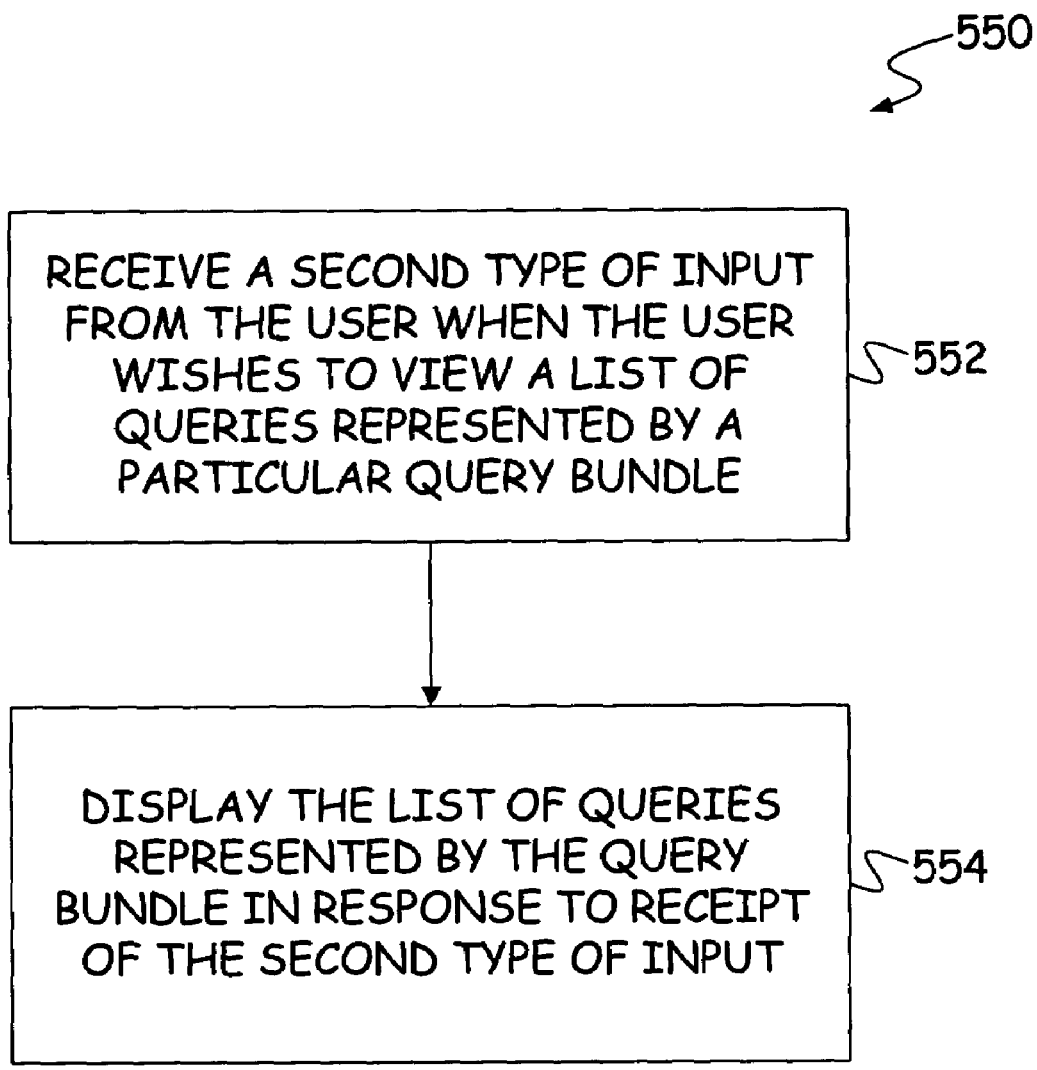

In some embodiments, the method of the present invention includes the additional steps shown in flow diagram 550 of FIG. 11. As illustrated at block 552, in these embodiments the method further includes receiving a second type of input from the user when the user wishes to view a list of queries represented by a particular query bundle. As illustrated at block 554, the list of queries represented by the query bundle is then displayed in response to receipt of the second type of input.

Figure 12:
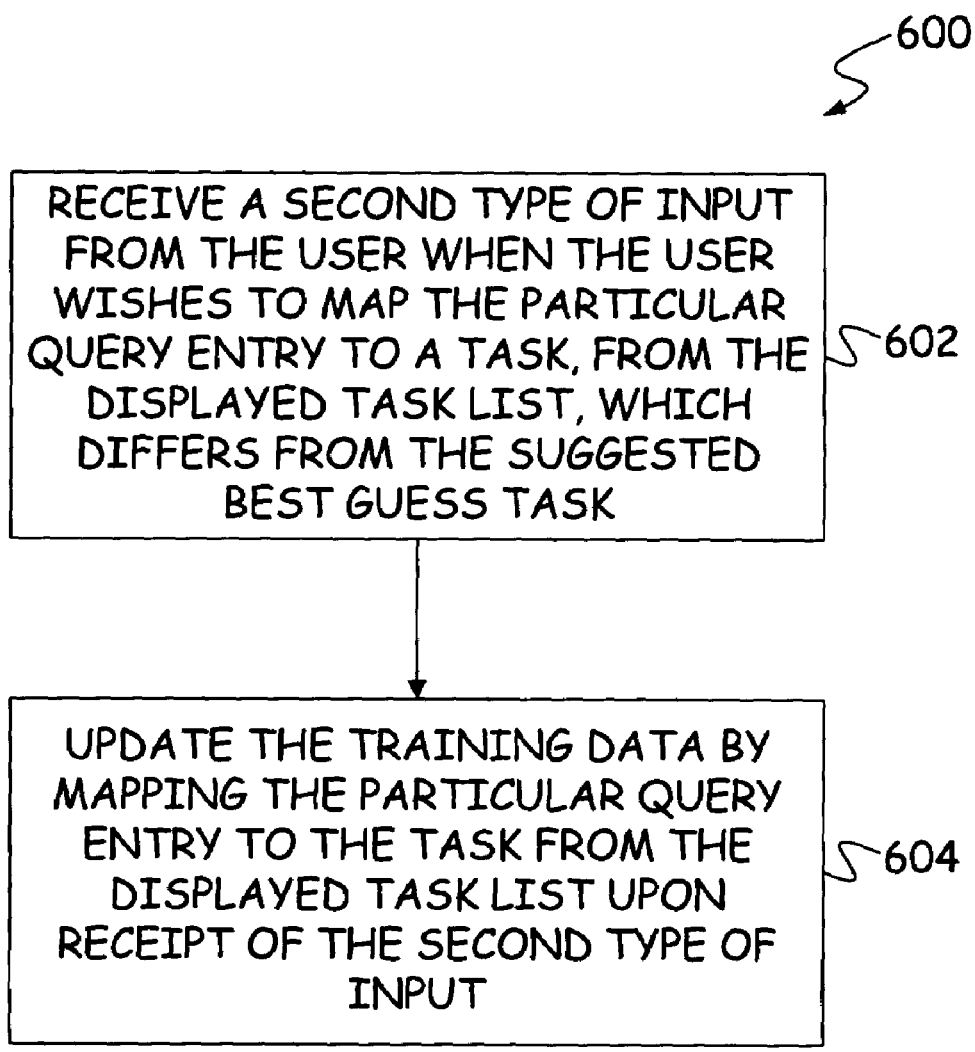

Referring now to FIG. 12, shown are additional steps of the method which can be included in some embodiments to allow the user to map a particular query entry to a task from the task list 302. For example, as shown at block 602 of flow diagram 600, the method can include the further step of receiving a second type of input from the user when the user wishes to map the particular query entry to a task, from the displayed task list, which differs from the suggested best guess task. As shown at the step of block 604, the training data is then updated, using the machine learning component, by mapping the particular query entry to the task from the displayed task list.

The GUI embodiments shown in FIGS. 3–7 implement the methods of the present invention as a "query-centric" operation. In other words, in these embodiments, the user assigns a best guess task to each of a plurality of queries. However, the invention can also be implemented as a "task-centric" operation in which best guess queries are assigned to particular tasks.

For example, referring to FIG. 13, shown is a GUI 700 which can be displayed on monitor 191 in accordance with some embodiments of the invention. GUI 700 includes a hierarchical task list 702. The user or author performing the query-to-task mappings selects a task from hierarchical task list 702 in order to view a list 704 of suggested queries for mapping with the task. This is shown in FIG. 14.

The GUI generating component 225 is configured to receive a first type of input from the user when the user wishes to map a particular task from task list 702 to one or more of the corresponding suggested best guessed queries. For example, a click of a mouse type pointing device with cursor 740 can be used to provide such an input. Lines 750 represent selection or highlighting of this task. In response to this input, the system or tool then shows the list 704 of queries suggested by the machine learner component. The queries are displayed in order of likelihood of matching the selected task. This process allows the user to map from tasks to probable queries as opposed to mapping from queries to probable tasks. In other respects, including improvement over time of resulting guesses, this process has the same behavior of the "query-centric" operation discussed above.

Figure 15:
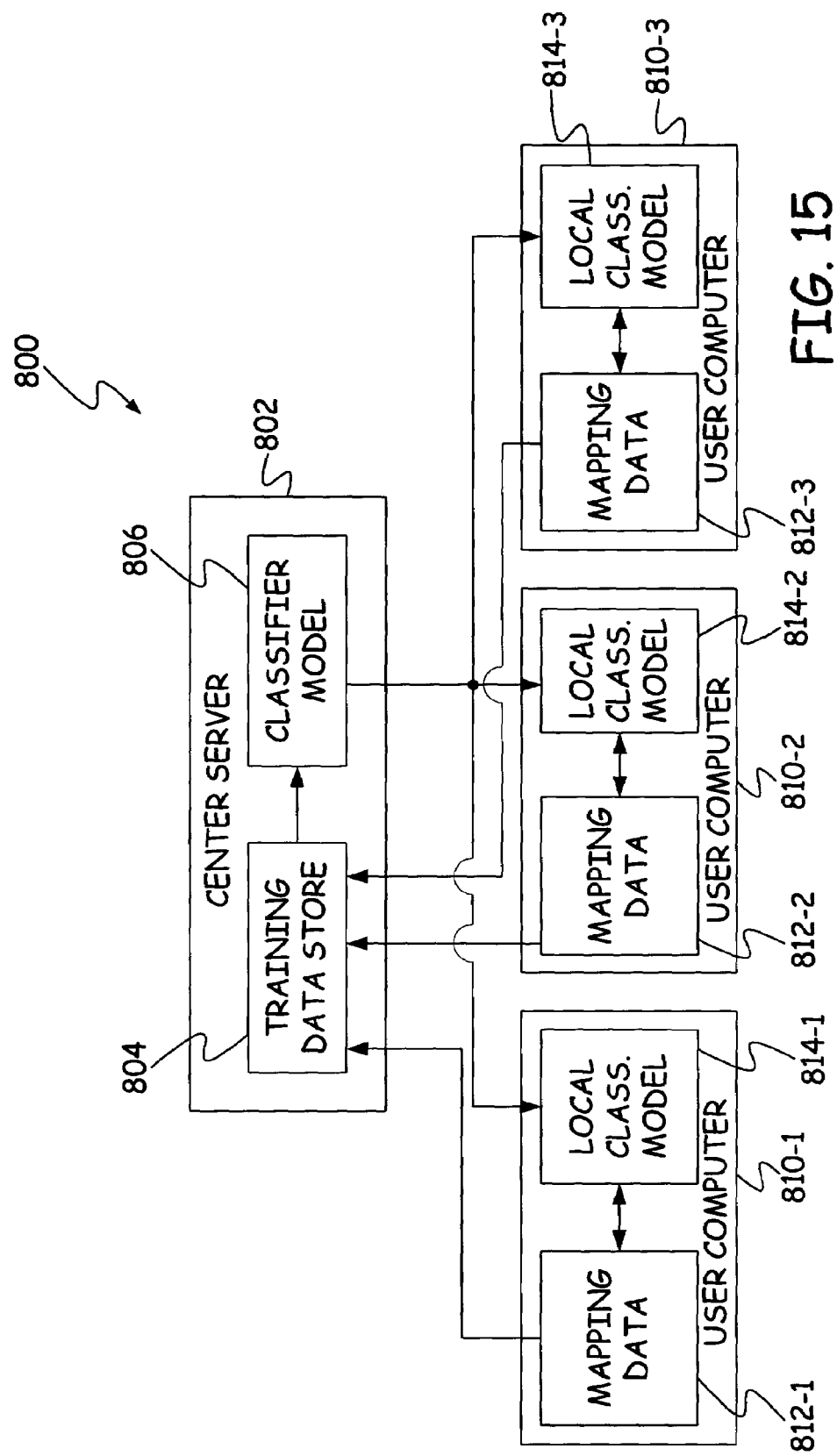
FIG. 15 is a block diagram illustrating one exemplary environment in which the present invention can be used.

In embodiments of the present invention, more than one user can map queries to tasks using the query-to-task mapping system. For example, consider the computing environment 800 shown in FIG. 15. Computing environment 800 includes a central server 802 and multiple user computers 810 (computers 810-1, 810-2 and 810-3 are shown). The central server computer includes a training data store 804 storing training data used to establish classifier model 806. In the illustrated system or processing environment 800, the creation of the classifier model 806 used by the machine learning component to provide guesses to a user is trained by the set of mappings committed by all users. The mappings are stored in the central database training data store 804. The classifier model 806 is periodically trained using these mappings. While training data store 804 and classifier model 806 are both shown as being stored on central server 802, in other embodiments, classifier model 806 is stored elsewhere, and can then be persisted to central server 802 from which users can download the updated model between mapping sessions.

The downloaded copy of the model (shown as local classifier model 814-1 through 814-3) is persisted locally on each user's computer. The user is then able to use a model that has been at least periodically trained with mapping data collected from all of the users. As a particular user proceeds with mapping work, the local copy 814 of the model is adapted to that individual user's mappings. This is illustrated by the inclusion of a local mapping data store 812-1 through 812-3 on each user computer. Thus, the user benefits because the local classifier model takes into account their most recent mappings. This increasing the accuracy of the guesses beyond the originally persisted model 806. Moreover, the user can adjust the degree to which the guesses are customized to the recent mappings. Periodically, the mapping data 812-1 through 812-3 corresponding to the mappings conducted at the local user computers are provided to training data store 804 on central server 802 for future updating of classifier model 806.

Figure 16:
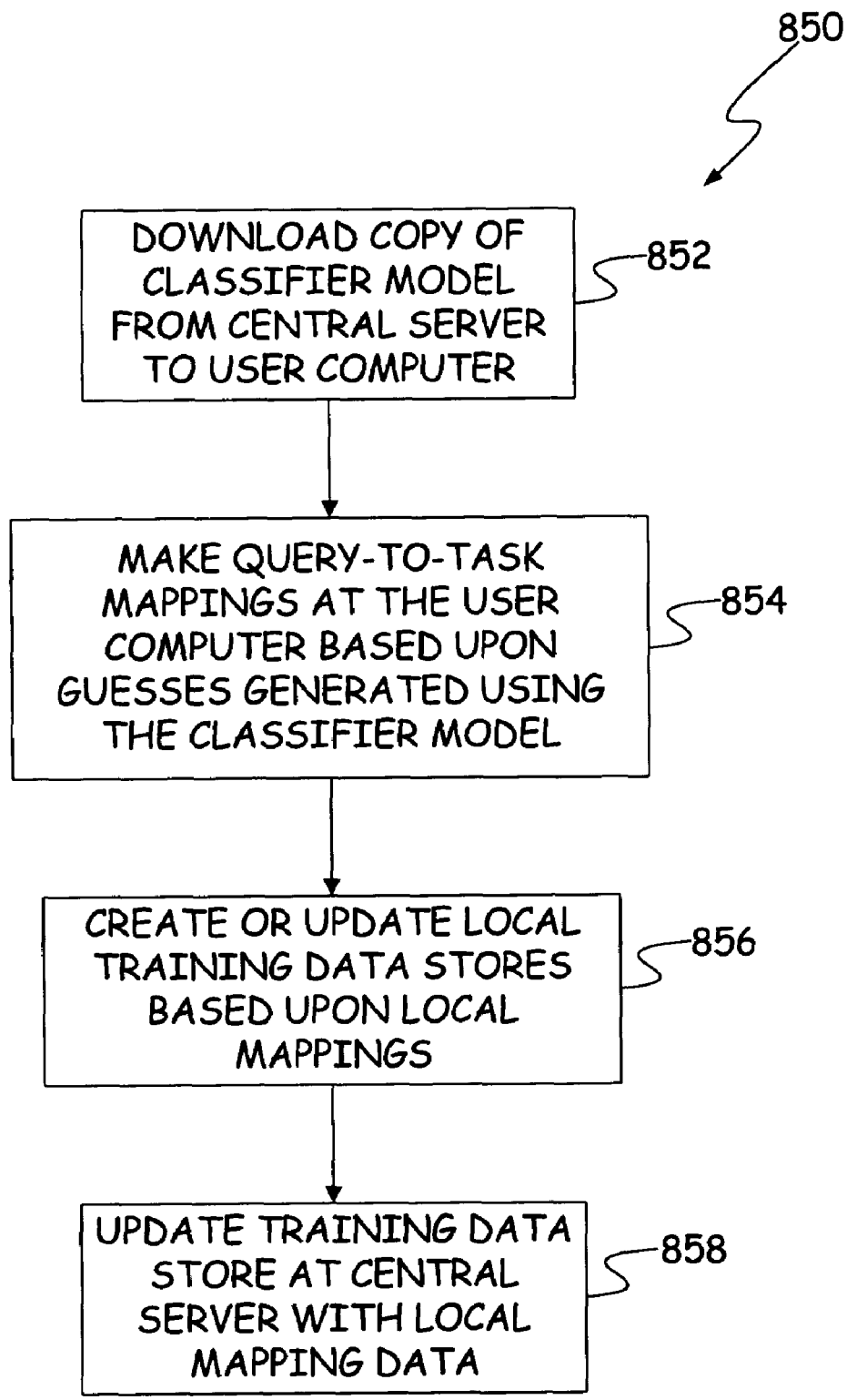
FIG. 16 is a flow diagram illustrating an embodiment of methods of the present invention.

The multiple user computer aspects of the present invention are also illustrated in flow diagram 850 shown in FIG. 16 which describes a general method of performing bulk mapping or queries to tasks using both a central server and a local computer. As shown in block 852 of FIG. 16, the method includes downloading a copy of a classifier model from the central server to a user computer. At block 854, the method is shown to include a step of making query-to-task mappings at the user computer based upon guesses generated using the classifier model which has been downloaded. At block 856 the method is shown to include the step of creating or updating local training data stores based upon local mappings. In other words, local mappings are used to update the local version of the classifier model stored on the user's computer. Finally, as shown at block 858, the method includes updating the training data store at the central server with the local mapping data. Thus, the classifier model 806 stored or downloaded to the central server is updated using a training data store 804 which includes mappings performed at each of the individual user computers.

When there is sparse query-to-task mapping data available, the classifier model 806 can be pre-trained using other sources of information. For example, this pre-training would frequently be used in the initial stages of the mapping process. The model can then be trained using the set of mappings committed by all users from the local computers. The relative influence of each of these sources of information can be adjusted. This pre-training can be applied to the model generation process at any point.

A standard pre-training technique is to extract a set of features from data associated with a task. The model can then be trained on an association between the features and the task. The effect is similar to that produced by mapping a query to a task. In the simplest form of this pre-training, the task name acts as a query for which a mapping to the task is introduced (although this query is not explicitly persisted). The pre-training can also be accomplished using textual mappings from another source. These mappings need not be exposed or persisted in the training data store.

During a user session at one of the local computers 810-1 through 810-3, the model's guesses can also be affected at the time they are generated. For example, a query will not appear as a guess if it has already been mapped to a task. This can prevent duplicate mappings from being made by multiple users. The user can also explicitly apply a filter to constrain the guesses that are presented.

Although the present invention has been described with reference to particular embodiments, workers skilled in the art will recognize that changes may be made in form and detail without departing from the spirit and scope of the invention.

What is claimed is:

1. An annotating system for aiding a user in performing bulk mapping of queries to tasks to update training data for training a search component, the annotating system comprising:
    a query log containing a plurality of queries which have previously been submitted to a search engine;
    a task list containing a plurality of possible tasks;
    a training data store containing training data;
    a machine learning component which suggests best guess query-to-task mappings for multiple query entries as a function of the training data; and
    a graphical user interface generating component which concurrently displays multiple query entries of the plurality of query entries in the query log in a manner which associates each of the displayed plurality of query entries with its corresponding suggested best guess task of the displayed task list and associated best guess probability;
    wherein when the graphical user interface generating component receives a first type of input from the user to map a particular query entry of the multiple concurrently displayed query entries to its corresponding suggested best guess task, the machine learning component updates the training data by mapping the particular query entry to the suggested best guess task to provide updated training data and stores the updated training data in the training data store for use in training at least one search component.

2. The annotating system of claim 1, wherein the machine learning component is configured to suggest, for each of the plurality of query entries corresponding to the query log, a best guess task for potential query-to-task mapping as a function of the training data.

3. The annotating system of claim 1, wherein the graphical user interface generating component is further configured to receive a second type of input from the user when the user wishes to view a list of next best guess tasks for the particular query entry for potential mapping.

4. The annotating system of claim 1, wherein each of the plurality of query entries corresponding to the query log is a query bundle, and wherein each query bundle represents a plurality of queries in the query log which have been bundled together.

5. The annotating system of claim 4, wherein upon receipt of the first type of input through the graphical user interface the machine learning component updates the training data by mapping each of the plurality of queries, represented by the query bundle, to the suggested best guess task.

6. The annotating system of claim 4, wherein the suggested best guess for each query bundle is a weighted average of best guesses for each of the plurality of queries represented by the query bundle.

7. The annotating system of claim 4, wherein the graphical user interface generating component is further configured to receive a second type of input from the user when the user wishes to view a list of queries represented by a particular query bundle, and in response to receipt of the second type of input the graphical user interface generating component being configured to display the list of queries represented by the query bundle.

8. The annotating system of claim 1, wherein the graphical user interface generating component is further configured to display the task list.

9. The annotating system of claim 8, wherein the graphical user interface generating component is further configured to receive a second type of input from the user when the user wishes to map the particular query entry to a task, from the displayed task list, which differs from the suggested best guess task, and wherein upon receipt of the second type of input through the graphical user interface the machine learning component is configured to update the training data by mapping the particular query entry to the task from the displayed task list.

10. The annotating system of claim 1, wherein upon updating the training data by mapping the particular query entry to a task, the machine learning component is configured to automatically update the best guess task for each of the remaining ones of the plurality of query entries as a function of the updated training data.

11. The annotating system of claim 10, wherein the machine learning component is a Naive Bayes classifier.

12. The annotating system of claim 1, wherein the machine learning component is configured to suggest, for each of the plurality of possible tasks in the task list, a list of queries from the query log which are probable for query-to-task mapping as a function of the training data.

13. A method of aiding a user in performing bulk mapping of queries to tasks to obtain updated training data for training a search component, the method comprising:
  obtaining a query log containing a plurality of queries which have previously been submitted to a search engine;
  obtaining a task list containing a plurality of possible tasks;
  determining for each of a plurality of query entries corresponding to the query log a best guess task for potential query-to-task mapping, wherein the best guess task is determined as a function of the training data using a machine learning component;
  displaying the plurality of query entries in the query log concurrently in a manner which associates each of the displayed plurality of query entries with its corresponding suggested best guess task of the displayed task list and associated best guess probability;
  receiving a first type of input from the user when the user wishes to map a particular query entry of the plurality of concurrently displayed query entries to its corresponding suggested best guess task; and
  updating the training data using the machine learning component, by mapping the particular query entry to the suggested best guess task, upon receipt of the first type of input; and
  storing the updated training data in memory for use in training at least one search component.

14. The method of claim 13, and further comprising:
  receiving a second type of input from the user when the user wishes to view a list of next best guess tasks for the particular query entry for potential mapping; and
  displaying the list of next best guess tasks, determined as functions of the training data using the machine learning component, for the particular query entry.

15. The method of claim 13, wherein each of the plurality of query entries corresponding to the query log is a query bundle, and wherein each query bundle represents a plurality of queries in the query log which have been bundled together.

16. The method of claim 15, wherein upon receipt of the first type of input the method further comprising:
  updating the training data, using the machine learning component, by mapping each of the plurality of queries represented by the query bundle to the suggested best guess task.

17. The method of claim 15, and further comprising:
  receiving a second type of input from the user when the user wishes to view a list of queries represented by a particular query bundle; and
  displaying the list of queries represented by the query bundle in response to receipt of the second type of input.

18. The method of claim 13, and further comprising displaying the task list.

19. The method of claim 18, and further comprising:
  receiving a second type of input from the user when the user wishes to map the particular query entry to a task, from the displayed task list, which differs from the suggested best guess task; and
  updating the training data, using the machine learning component, by mapping the particular query entry to the task from the displayed task list upon receipt of the second type of input.

20. The method of claim 13, and upon updating the training data by mapping the particular query entry to a task, further comprising automatically updating the best guess task, using the machine learning component, for each of the remaining ones of the plurality of query entries as a function of the updated training data.

21. The method of claim 20, wherein the machine learning component is a Naive Bayes classifier.

22. The method of claim 13, wherein determining for each of the plurality of query entries corresponding to the query log a best guess task further comprises determining, for each task in the task list, a list of queries from the query log which are probable for query-to-task mapping as a function of the training data using the machine learning component.

23. A computer readable medium containing computer executable instructions for implementing the steps of claim 13.

* * * * *